No. 752,156. PATENTED FEB. 16, 1904.
G. HACKER.
CLAMPING DEVICE.
APPLICATION FILED JUNE 2, 1903.
NO MODEL.

Witnesses
Alfred A. Eicks
M. Drien

Inventor
George Hacker
by Higdon, Longan & Hopkins
attys.

No. 752,156. Patented February 16, 1904.

UNITED STATES PATENT OFFICE.

GEORGE HACKER, OF ST. LOUIS, MISSOURI, ASSIGNOR OF ONE-HALF TO HENRY J. VOLLMER, OF ST. LOUIS, MISSOURI.

CLAMPING DEVICE.

SPECIFICATION forming part of Letters Patent No. 752,156, dated February 16, 1904.

Application filed June 2, 1903. Serial No. 159,808. (No model.)

*To all whom it may concern:*

Be it known that I, GEORGE HACKER, a citizen of the United States, residing at St. Louis, State of Missouri, have invented certain new and useful Improvements in Clamping Devices, of which the following is a specification, containing a full, clear, and exact description, reference being had to the accompanying drawings, forming a part hereof.

This invention relates to improvements in a clamping device; and it consists in the novel arrangement, construction, and combination of parts, as will be fully hereinafter described and claimed.

The object of this invention is to construct a device whereby any object may be clamped upon a pipe or rod at any given point without necessarily threading the entire pipe or rod.

A further object of this invention is to provide a clamp whereby the point through which the pipe is passed is made secure and water and air tight.

Figure 1:
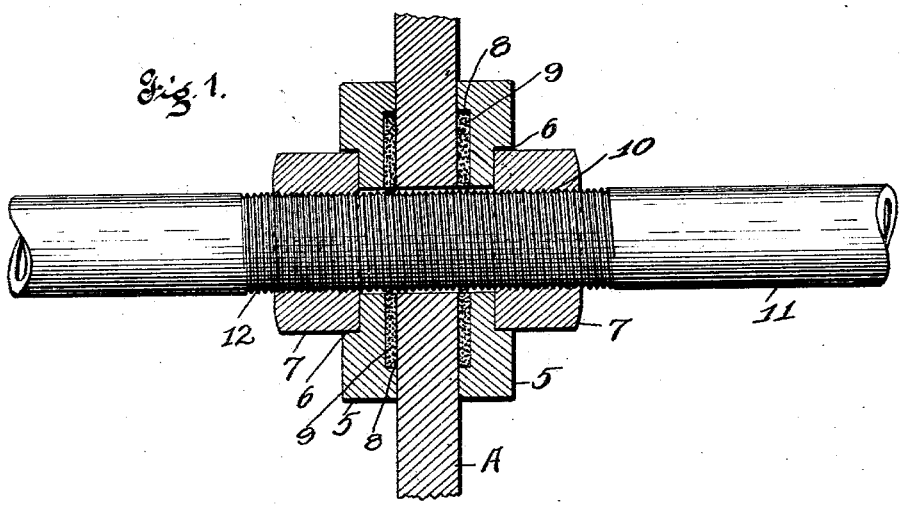
Figure 2:
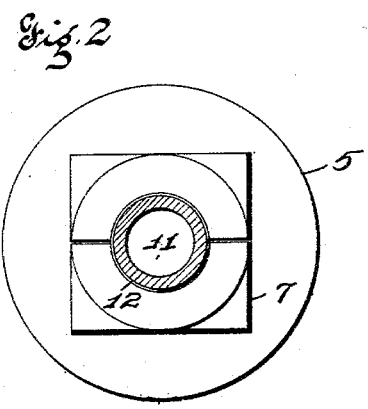
Figure 3:
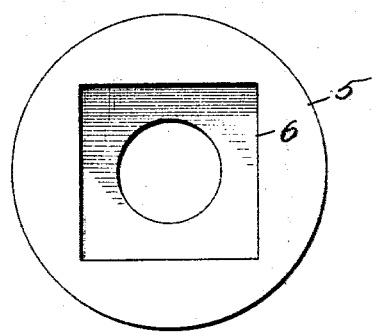
Figure 4:
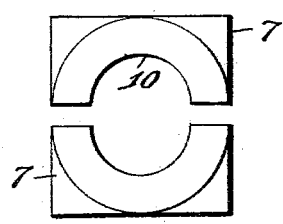

Figure 1 is a vertical sectional view of my improved clamping device, showing the same in position upon a pipe. Fig. 2 is a side view of the same with the pipe in section. Fig. 3 is a detail plan view of the washer made use of in carrying out my invention. Fig. 4 is a detailed view of the split nut made use of in carrying out my invention.

In the construction of my improved invention I provide washers 5, the outer surface of which is provided with a recess 6, arranged in shape to correspond with the shape of the nut 7. The other face of the washers is also provided with recesses 8, in which packing 9 is adapted to be placed when so desired. The split nut 7 is constructed of two parts formed by splitting the ordinary nut longitudinally and transversely of the threads, as shown in Fig. 4, each part being provided with the internal screw-threads 10.

The pipe 11, to which the clamping device is secured, is provided with screw-threads 12.

The operation of my invention is as follows: When it is desired to apply my clamping device at any location upon the pipe, that portion of the pipe is provided with screw-threads, as shown in Fig. 1, and the device to be clamped upon said pipe, which is indicated by the letter A, is placed thereon. The washers 5 are then placed one on each side thereof and the packing 9 placed in position. The split nuts are then placed over the threads of the pipe 11 and said nuts turned in opposite direction. By this operation they will pass into the recesses 6, tightly compressing said washers against each side of the object, and they are held in locked position by the walls of the recesses 6.

To release the device, the nuts are again turned in opposite directions to that when applied, and when sufficiently loose the washers are pressed inwardly and the nuts will fall from their location on account of the same being halved.

The part referred to by the letter A in the drawings may represent the side of a tank, the bottom of a barrel, or any object through which a long pipe is extended.

Having fully described my invention, what I claim is—

1. A clamping device comprising a threaded rod, two oppositely-threaded nuts split longitudinally in halves, washers recessed to receive the bases of the nuts, the nuts being adapted to be screwed toward each other upon the rod to hold an intervening object in place upon the rod, the halves of the nuts being held together by the recesses in the washers, substantially as described.

2. A device of the class described, comprising a washer, a pipe, recesses formed in said washer, packing material placed in one of said recesses, a split nut adapted to be placed upon a threaded portion of said pipe and to lodge within the other recess of the washer when brought in contact therewith and held in locked position upon said pipe by the walls of the recess of said washer, substantially as specified.

3. A device of the class described, comprising a split nut, a pipe, threads formed on a portion of said pipe, washers having recesses, one of said recesses retaining packing, the other recess receiving the square end of the split nut, the several parts when placed together forming a complete clamping device when brought in contact with the object to be supported upon the pipe, substantially as specified.

In testimony whereof I have signed my name to this specification in presence of two subscribing witnesses.

GEORGE HACKER.

Witnesses:
ALFRED A. EICKS,
M. G. IRION.